United States Patent
Culverhouse

(10) Patent No.: US 10,051,044 B2
(45) Date of Patent: Aug. 14, 2018

(54) COMMUNITY SPACE FOR SHARING CONTENT

(71) Applicant: Flipboard, Inc., Palo Alto, CA (US)

(72) Inventor: Jason Culverhouse, Redwood City, CA (US)

(73) Assignee: Flipboard, Inc., Palo Alto, CA (US)

( * ) Notice: Subject to any disclaimer, the term of this patent is extended or adjusted under 35 U.S.C. 154(b) by 160 days.

(21) Appl. No.: 15/189,743

(22) Filed: Jun. 22, 2016

(65) Prior Publication Data

US 2017/0374135 A1    Dec. 28, 2017

(51) Int. Cl.
*G06F 15/16* (2006.01)
*H04L 29/08* (2006.01)

(52) U.S. Cl.
CPC .............. *H04L 67/10* (2013.01); *H04L 67/06* (2013.01)

(58) Field of Classification Search
USPC ........................................................ 709/204
See application file for complete search history.

*Primary Examiner* — Hee Soo Kim
(74) *Attorney, Agent, or Firm* — Fenwick & West LLP

(57) ABSTRACT

A digital magazine server generates an ownerless digital magazine for a community space. The digital magazine server is configured to receive a first sharing request for a community space from a user of the digital magazine server. In response, the digital magazine server creates a community space which includes a community space identification (ID) and an allocated storage space for the community space in the digital magazine server. The digital magazine server provides the community space ID to other users, who can contribute content to the community space through the digital magazine. The digital magazine server also automatically selects content not shared by the community members, where the digital magazine server identifies content for the community space, trains one or more models using various machine learning techniques to generate scores for the identified content, and selects identified content based on the scores for the community space.

16 Claims, 4 Drawing Sheets

COMMUNITY SPACE FOR SHARING CONTENT

BACKGROUND

This invention generally relates to generating and displaying content presented by a digital magazine server, and more particularly to creating a community space, where community members share content through an ownerless user-curated digital magazine.

Many online services allow users to share content, e.g., post comments on content items presented to the users. Content items (e.g., a video or news article) on a topic are presented in a digital magazine, which can be controlled by an owner of the digital magazine. For example, an owner of a digital magazine can freely delete a content item without concerning other viewers of the content item. However, the conventional means of having an owner control the content of a digital magazine may degrade user experience with the digital magazine, especially when the owner of the digital magazine deletes content items of interest to other viewers of the digital magazine. Furthermore, conventional solutions to associate ownership of a digital magazine with individual users often limit the scope of collecting and presenting content items and associated comments on the content items that are likely of interest to a community of users.

SUMMARY

Embodiments of the invention provide an ownerless digital magazine for a community space, where members of the community share content to the community space through the digital magazine and a digital magazine server may select content to be displayed in the digital magazine based on the shared content in the community space. The digital magazine server is configured to receive a first sharing request for a community space from a user of the digital magazine server. In response, the digital magazine server creates a community space if the community space is not already in existence, and shares content from the user who sent the first sharing request to the community space. The digital magazine server provides a community space identification (ID) to other users, who can contribute content to the community space through the digital magazine. In addition to the user-curated content being shared in the community space, the digital magazine server selects content that have not been shared by the community members for the community space, where the digital magazine server identify content not shared by the community members, trains one or more models using various machine learning techniques to generate scores for the identified content, selects content for the community space based on the scores, and shares the selected content to the community space. The digital magazine server presents the digital magazine created for the community space to community users of the digital magazine.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict a preferred embodiment of the invention for purposes of illustration only. One skilled in the art will readily recognize from the following discussion that alternative embodiments of the structures and methods illustrated herein may be employed without departing from the principles of the invention described.

DETAILED DESCRIPTION

A digital magazine server generates a digital magazine for a community space based on content contributed by users of the community and content automatically selected from one or more sources based on scores generated by a trained model of the digital magazine server. For simplicity, the ownerless digital magazine created for the community is referred to as "community digital magazine," and the terms "community space" and "community" are used interchangeably. The generated community digital magazine is received by a digital magazine application executing on a client (such as a mobile communication device, tablet, computer, or any other suitable computing system) of a user, or is generated by the digital magazine application executing on the client according to the instructions received from the digital magazine server. The community digital magazine is presented to the user, who interacts with presented content of the community digital magazine, or contributes content for sharing to the community space. The community digital magazine includes one or more digital content items, also referred to as "articles", which may include textual articles, pictures, videos, audio, user-generated content (e.g., content posted on a social networking system), advertisements, and any other types of content capable of display within the context of the community digital magazine.

Figure 1:
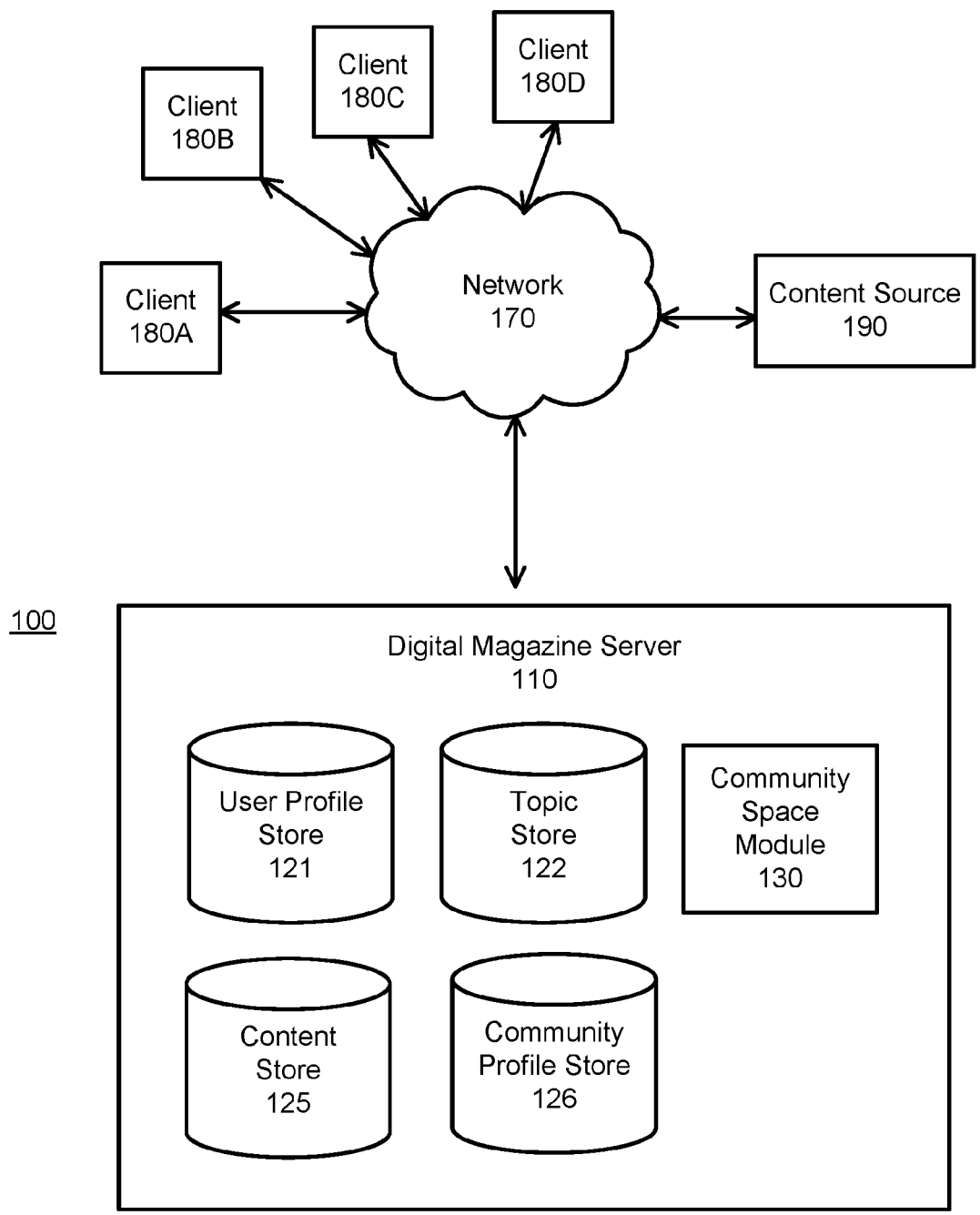
FIG. 1 illustrates a system environment in which a digital magazine server creates an ownerless digital magazine for a community space according to one embodiment.

FIG. 1 illustrates a system environment 100 in which a digital magazine server creates an ownerless digital magazine for a community space according to one embodiment. The system environment 100 shown by FIG. 1 includes a digital magazine server 110, a network 170, four clients 180A, 180B, 180C, and 180D, and a content source 190. In alternative configurations, different and/or additional components may be included in the system environment 100. The embodiments described herein can be adapted to online systems that are not digital magazine servers 110. FIG. 1 and the other figures use like reference numerals to identify like elements. A letter after a reference numeral, such as "180A," indicates that the text refers specifically to the element having that particular reference numeral. A reference numeral in the text without a following letter, such as "180," refers to any or all of the elements in the figures bearing that reference numeral (e.g. "180" in the text refers to reference numerals "180A" and/or "180D" in the figures).

The clients 180 communicate with the content source 190 and the digital magazine server 110 through the network 170, which is typically the Internet. However, the network 170 can be any network, such as a local area network (LAN), a metropolitan area network (MAN), a wide area network (WAN), a wired or wireless network, a private network, or a virtual private network, or some combination thereof. In some embodiments, all or some of the communication links of the network 170 may be encrypted using any suitable technique or techniques.

The content source 190 is a computing system that provides various types of content, such as text, digital images, videos, or audio, to the clients 180A, 180B, 180C, and 180D and the digital magazine server 110. A content item may be provided by the user of clients 180, and may be stories about news events, product information, entertainment, or educational material from a publisher. A content item may also be user-generated, such as a blog, a shared image, an album of shared image, a video, an audio file, or a social networking post. For convenience, content from a source, regardless of its composition, may be referred to herein as an "article," a "content item," or as "content." A content item may include various types of content elements such as text, images, video, interactive media, links, or a combination thereof.

In one embodiment, the clients 180A, 180B, 180C, and 180D are computing devices capable of receiving user input as well as transmitting and/or receiving data via the network 170. The clients 180 may be, for example, personal computers, digital assistants, personal digital assistants, cellular phones, mobile phones, smart phones, or laptop computers. In one embodiment, each client 180, e.g., 180A, 180B, 180C or 180D, executes an application allowing a user of the client 180 to interact with the digital magazine server 110. For example, a client 180A allows a user to interact with the digital magazine server 110 by viewing content items, commenting on content items, and providing comments and viewing comments from other users of the digital magazine server 110.

In another embodiment, a user of the client 180 interacts with the digital magazine server 110 through an application programming interface (API) running on a native operating system of the client 180, such as IOS® or ANDROID™. In various embodiments, any number of clients 180 may communicate with the digital magazine server 110. Different clients may have different characteristics such as different processing capabilities, different connection speeds with the digital magazine server 110 over the network 170, and different device types (e.g., make, manufacture, or version).

The digital magazine server 110 receives content items from the content source 190 or from users of the clients 180, generates pages in a digital magazine created for a community space by processing the received content, and provides the pages to the clients 180. Additionally, the digital magazine server 110 receives comments on content items of the digital magazine from users of the clients 180. In the embodiment shown by FIG. 1, the digital magazine server 110 includes a user profile store 121, a topic store 122, a content store 125, a community profile store 126, and a community space module 130. In other embodiments, the digital magazine server 110 may include additional, fewer, or different components for various applications. For example, the digital magazine server 110 may also include an interface module for receiving user interactions with content items presented to the user.

The user profile store 121 of the digital magazine server 110 stores a user profile for each user of a community space. A user of the community space can contribute content to a digital magazine created for the community, e.g., a community digital magazine, and/or view and interact with content items presented in the community digital magazine. A user profile includes declarative information about the user that was explicitly shared by the user and may also include profile information inferred by the digital magazine server 110. In one embodiment, a user profile includes multiple data fields, each describing one or more attributes of the corresponding user of the digital magazine server 110. Examples of information stored in a user profile include biographic, demographic, and other types of descriptive information, such as work experience, educational history, gender, hobbies or preferences, and geographic location. A user profile may also include a list of topics in which a user has indicated interest based on user's interactions with content items and comments on the content items presented to the user. This list of topics can be used to determine what content items to present to the user in a digital magazine personalized for the user, where a user owns the digital magazine. The user profile may include a username and a user icon or avatar to display with comments posted by the corresponding user. The user profile can be used by the digital magazine server 110 to identify common topics of interest for a community digital magazine shared by other community members and to rank topics of interest to be presented in the community digital magazine to the community.

The topic store 122 stores a catalog of different topics. In one embodiment, the topic store 122 is partitioned into multiple parts, one of which is to store topics associated with one or more community digital magazines. Topics may be predetermined or may be generated from various data sources, such as webpages and publically available social networking sources or content contributed by users of a community space, by the digital magazine server 110. A content item of a digital magazine can be related to a particular topic, e.g., "Donald Trump," and "Hillary Clinton"; a topic of a content item can be represented by key terms, phrases associated with the content item, which describe certain characteristics of the content item, such as famous people, sports teams, cities, movies, television shows, books, current events (e.g., 2016 U.S. presidential election), geographical sites, ideologies, academic fields, etc. Multiple content items may be associated with a common topic or associated with similar topics, e.g., news articles on Donald Trump and Hillary Clinton associated with the topic of 2016 U.S. presidential election; topics with similar names are differentiated based on the context in which each topic is used. Example embodiments of generating topics from various data sources and differentiating topics with similar names by the digital magazine server 110 are described in the U.S. patent application Ser. No. 12/896,700, filed Oct. 1, 2010, which is hereby incorporated by reference herein in its entirety.

The content store 125 stores content items or references to content items of digital magazines, such as Uniform Resource Locators (URLs) to content items. The content store 125 may also store user-generated comments on content items presented to users and replies to the comments from users of the digital magazine server 110. Each comment is associated with a content item. The content store 125 may also store parameters related to the content such as community ID, source, timestamp, title, and image (e.g., a thumbnail of the content). The community ID of a content item identifies the community space, where the content item is shared by the community members. The source is the source of the content (e.g., a reference to a publisher of the content or the user profile of a user who uploaded or contributed the content). The timestamp is the time (e.g., calendar date, hour, minute, and second) that the content was received from the content source, or was originally published. The timestamp may also store times when the content was edited (e.g., a correction to a news article issued by the content source). Additionally, for each comment on the content item, the timestamp also stores times when the comment was posted. The title may be, for example, the headline of an article, or the tag or title of a video. The thumbnail may be a smaller version of an image derived from an image present in an article, a frame of a video, or an image selected from a gallery of images to describe a content item. The titles and thumbnails of multiple content items may be displayed in a user interface (UI) concurrently allowing a user to select between the content items in order to view it.

The community profile store 126 stores one or more community profiles. A community profile includes information describing a community space such as a community space ID, one or more storage space parameters (e.g., size of storage space allocated for the community space, location of storage space in the digital magazine server 110), a community topic list, a representative of the community space, and a list of user IDs of community members. In one embodiment, the representative of a community space is a user of the digital magazine server 110, who is first to request sharing content to the community space among other users associated with the community space. The topic list is generated and updated by the digital magazine server 110 based on content shared into the community space by its community members.

The community space module 130 creates a community space by generating a community digital magazine for community members of the community space to share content via the community digital magazine. The community digital magazine is an ownerless digital magazine, which is not owned by an individual community member of the community space; instead, the community digital magazine is owned collectively by the community for which the magazine is created. In one embodiment, the community space has a community space ID, a storage space of a certain size and location in the digital magazine server 110 for the community space. The community space stores content shared into the community space by community members, and shares content to community members of the community through the community digital magazine. Once the community space is created by the community space module 130, the community space module 130 identifies content items not shared by the community members, trains a model to generate scores for the identified content, and selects additional content based on the score for the community space based on the content shared into the community space. More details of the community space module 130 are described below with reference to the detailed description of FIG. 3.

Community Space and Community Digital Magazine

Figure 2:
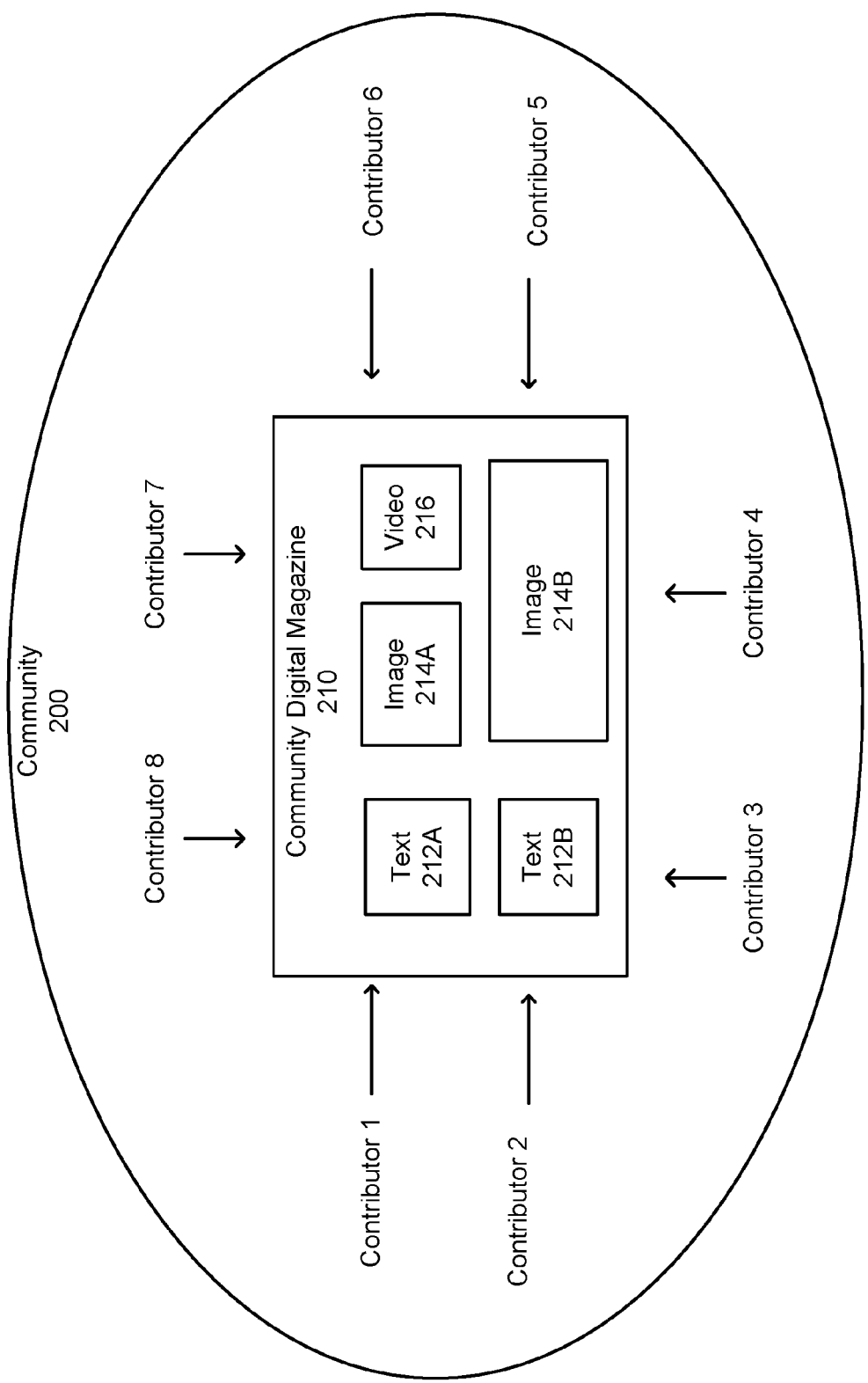
FIG. 2 illustrates an example community and a digital magazine created for the community according to one embodiment.

FIG. 2 illustrates an example community 200 and a community digital magazine 210 created for the community 200 according to one embodiment. The community 200 has eight community members, Contributor 1, Contributor 2, Contributor 3, Contributor 4, Contributor 5, Contributor 6, Contributor 7, and Contributor 8. Each of the community members can share content with other community members of the community 200 via the community digital magazine 210. The contributors 1, 2, 3, 4, 5, 6, 7, and 8 are users of the digital magazine server 110, who have shared content into the community 200. The community 200 is created upon a request from a first sharing user, e.g., Contributor 1, who requests to share content into a community space. For example, Contributor 1 sends a request to the digital magazine server 110, requesting sharing an article on Donald Trump running for 2016 U.S. presidential election to a community space. The community space module creates a community, e.g., a community for discussing 2016 U.S. presidential election, and a community digital magazine to present the article contributed by Contributor 1 to other users of the digital magazine server 110, who can join the community to become community members.

In the example shown in FIG. 2, the community digital magazine 210 includes five content items, e.g., text 212A and 212B, image 214A and 214B, and video 216, which are contributed either by the community members or selected by the community space module 130. The community 200 and the community digital magazine 210 may include additional or different components from those shown in FIG. 2 in other embodiments.

In one embodiment, the content of the community digital magazine 210 may be displayed on the community digital magazine 210 such as images (e.g. 214A, 214B), media (e.g., video 216), or text (e.g., 212A, 212B), or a combination of thereof. Some of the content displayed prominently on community digital magazine 210 may have been selected by the community space module 130 based on previously shared items into the community space by contributors 1, 2, 3, 4, 5, 6, 7, or 8. For example, Contributor 1 is the first sharing user, or representative of the community 200 and shared image 214B to the community 200. Contributor 2 may have shared text 212B and image 214A. Contributors 3, 4, and 5 may have previously shared items that are no longer being displayed on the community digital magazine 210. Contributor 8 may have shared text 212A. The community space module 130 may have selected video 216 based on the content shared by contributors 1, 2, 3, 4, 5, 6, 7, or 8.

Figure 3:
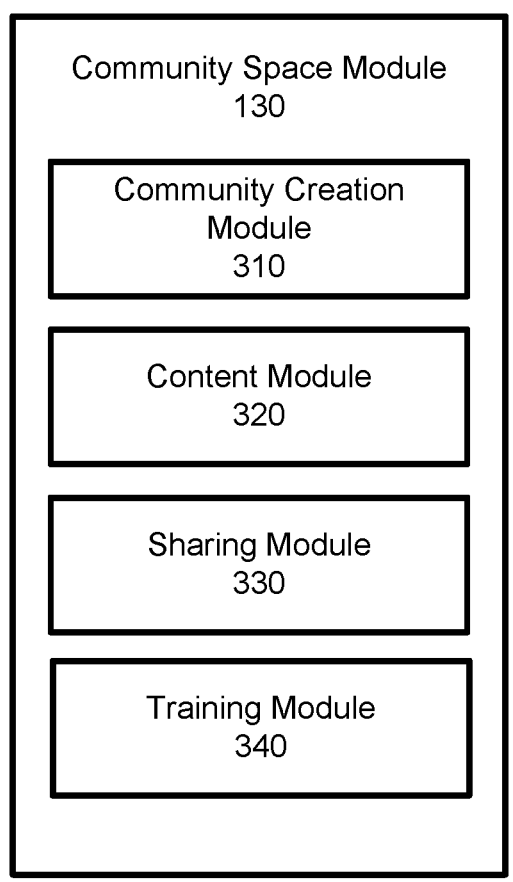
FIG. 3 is an example of a community space module for creating an ownerless digital magazine for a community space according to one embodiment.

FIG. 3 is an example of a community space module 130 for creating a community space through an ownerless digital magazine for the community space according to one embodiment. The community space module 130 processes requests from contributors of a community to share content into the community space and shares the content contributed by community members among community members via the community digital magazine. Based on the content shared in the community space, the community space module 130 trains a model to assist in selecting content for the community space. In the example shown in FIG. 3, the community space module 130 includes a community creation module 310, a content module 320, a sharing module 330, and a training module 340.

The community creation module 310 creates a community space and a community digital magazine for community members to share content among each other through the community digital magazine. In one embodiment, the community creation module 310 creates a community space when the digital magazine server 110 receives a request from a first contributor to share content into a community space if the community space is not yet in existence. The community creation module 310 creates a community digital magazine for community members of the community space to share content via the community digital magazine. The community digital magazine is an ownerless digital magazine. In other words, the community digital magazine is not owned by an individual community member of the community space; instead, the community digital magazine is owned collectively by the community for which the magazine is created. The community space has a community space ID, a storage space of a certain size and location in the digital magazine server 110 for the community space.

In another embodiment, the community creation module 310 creates a community space by combining multiple existing communities. For example, the digital magazine sever 110 has created multiple communities discussing various aspects of the 2016 U.S. presidential election, e.g., community 1 on Donald Trump running for the U.S. president, community 2 on Hillary Clinton running for the U.S. president, community 3 on 2016 U.S. presidential election primaries, and community 4 on 2016 U.S. presidential election polls. The common thread among these four communities is the 2016 U.S. presidential election. The community creation module 310 creates a new community, e.g., 2016 U.S. presidential election, by combining these four existing communities and shares the content from the existing communities and new content among the community members of this newly created community.

In one embodiment, the community creation module 310 determines whether to create a new community from existing communities based on a variety of factors such as similarities of topics shared by existing communities, storage usage of existing communities, sharing activities of existing communities, timestamps representing the creation time of existing communities, and number of communities members of existing communities. For example, a community created a while ago with low amount of sharing activities over a period of time and having only a few community members can be combined with another community on similar topic and having very active content sharing activities by a large number of community members.

The content module 320 stores content shared into the community space in the allocated storage space by community members. In one embodiment, each content shared into the community space is associated with the community ID, e.g., in a triplet such as <contributor_ID, content_ID, community_ID>, and is stored by the content module 320 in the storage space allocated for the community space. If the content is automatically selected by the community space module 130, the contributor ID of the content is set to a predetermined default value, e.g., NULL.

A content item shared into the community space is associated with one or more topics, and has one more comments from other community members. The content module 320 determines the topic of each content shared into the community space using a variety of topic identification techniques such as natural language processing techniques to analyze the text of the content based on the words in the text and semantic relations between the words. Example embodiments of generating topics from content and differentiating topics with similar names by the content module 320 are described in the U.S. patent application Ser. No. 12/896,700, filed Oct. 1, 2010, which is hereby incorporated by reference herein in its entirety. The content module 320 generates a community topic list based on the determined topics of shared content in the community space. The community topic list may be stored as part of the community space profile in the community profile store 126 shown in FIG. 1.

The sharing module 330 shares content contributed by community members of a community space and content automatically selected into the community space by the community space module 130. In one embodiment, the sharing module 330 determines sharing priorities associated with each community member. For example, the first contributor for a community space becomes the representative of the community space and can have more privileges than other community members, such as having higher priority to get his/her content published on the community digital magazine. The representative of the community space may enjoy additional benefits for sharing content via the community digital magazine. For example, the representative of the community space may have his/her comments on a content item assigned larger weight such that his/her comments can be ranked higher among comments made by other community members.

The sharing module 330 also determines the presentation and layout of the community digital magazine. In one embodiment, the sharing module 330 uses a page template, which describes a spatial arrangement ("layout") of content items relative to each other on a page of the community digital magazine for presentation by a client 180 associated with a community member. One or more page templates may be associated with types of clients 180, allowing content items to be presented in different relative locations and with different sizes when the content items are viewed using different clients 180. The sharing module 330 may display content based on information from the training module 340. For example, the sharing module 330 may prominently display content which is most closely related to a trending topic of the community space determined by the training module 340, or choose not to display content shared into the community space if the content is not highly relevant or has a number of "dislikes" exceeding a threshold value.

Once the community space is created, the community space module 130 automatically selects one or more content items not shared by the community members for the community digital magazine based on the content items contributed by the community members. The automatic selection involves identifying the one or more content items not shared by the community members, generating a score for each of the identified content items not shared by the community members using a model, and selecting the one or more identified content items based on the scores associated with the identified content items. The training module 340 of the community space module 130 trains a model to generate scores for the identified content items based on the content shared into the community space. The score of each content item indicates a likelihood of the content item to be selected for the community digital magazine. In one embodiment, the training module 340 uses machine learning techniques including, but not limited to, stochastic gradient descent and decision trees to train the model based on training data such as the content shared into the community space. For example, the training module 340 can train the model based on frequency of sharings on a particular topic in the community space, popularity of a topic among community members of the community space), or number of comments and quality of comments on a topic. Each content item shared into the community space can be assigned a weight based on its date of sharing, with newer content data being assigned a higher weight. In one embodiment, the trained model when applied to a content item generates a prediction of likelihood of the content item being of interest to the community space.

The model trained by the training module 340 is used by the content module 320 to search the topic store 122 and the content store 125 of the digital magazine server 110 to select content that are likely of interest to the community. In one embodiment, the trained model is applied to each content item associated to a topic of the community space and generates a prediction score for each content item. The prediction score of a content item represents a degree of interest by the community in the content item. The content module 320 ranks the content items based on their associated prediction scores, and selects one or more content items for sharing among the community members through the community digital magazine.

The results of the model training by the training module 340 may influence the content presented in the community digital magazine. For example, the results of the model training can be used to identify trending topics among the topics in the list of community topics. Such identifications can be used by the sharing module 330 to adjust the presentation layout of a page of the community digital magazine. For example, a content item most closely related to the trending topic can be presented more prominently than other content items on the page.

Figure 4:
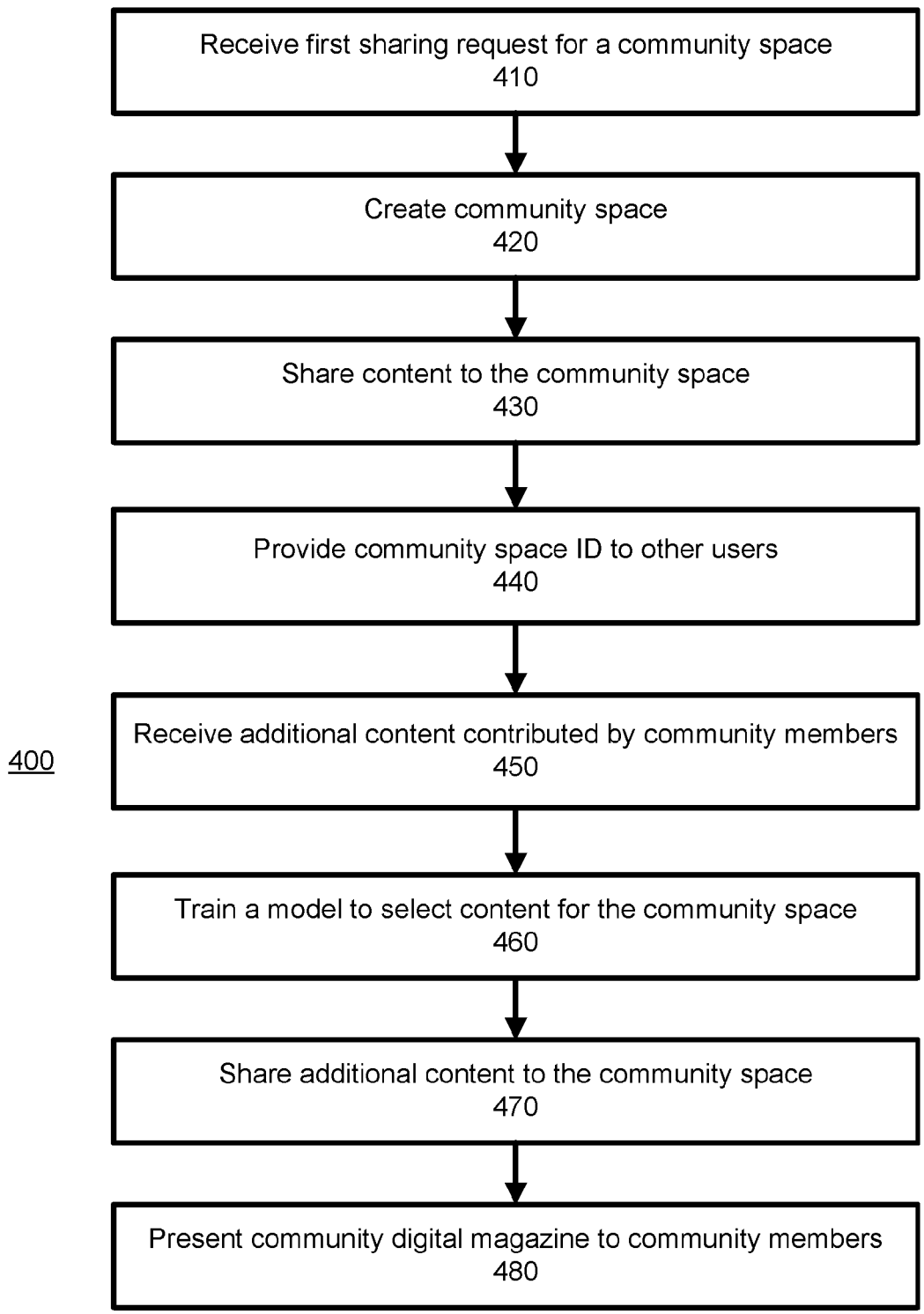
FIG. 4 is a flowchart of an example process for creating a digital magazine for a community space according to one embodiment.

FIG. 4 is a flowchart 400 of an example process for generating a community digital magazine according to one embodiment. Initially, the community space module 130 of the digital magazine server 110 receives 410 a first sharing request for a community space from a user. The community space module 130 creates 420 a community space by generating a community digital magazine. The community space has a community space ID, allocated storage space, and a community profile. The community space module 130 shares 430 the content from the first sharing user through the community digital magazine. The community space module 130 provides 440 the community space ID to the other users of the digital magazine server 110. The community space module 130 receives 450 additional content contributed by other community members for the community space. The community space module 130 trains 460 a model to assist in selecting additional content for the community space based on the content shared into the community space, e.g., selecting content not shared by the community members based on prediction scores of the content generated by a trained model. The community space module 130 shares 470 the additional content (shared by community members and automatically selected by the community space module 130) to the community space and determines the presentation and layout of the community digital magazine for presenting the shared content. The community space module 130 presents 480 the community digital magazine created for the community space to its community members.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for content sharing in a community space, the method comprising:

receiving a first sharing request for the community space from a user;

creating the community space in a digital magazine server, the community space comprising a community space identification (ID) and an allocated storage space for the community space in the digital magazine server;

generating a community digital magazine for the created community space;

receiving one or more content items for the community digital magazine contributed by a plurality of users, wherein each of the plurality of users is a community member of the community digital magazine, and each content item from a community member of the community digital magazine is shared with remaining community members of the community digital magazine;

presenting content items contributed by the one or more community members in the community digital magazine; and automatically selecting one or more candidate content items not shared by the community members for the community digital magazine based on the content items previously contributed by the community members, wherein the automatic selection comprises:

accessing a machine learning model trained using information about a set of content items including the content items previously contributed by the community members, each content item being associated with a topic, where a label of the machine learning model is whether each content item was added to the community space, and one or more input features of the machine learning model include one or more of: a frequency of sharing of the topic associated with the content item, a number of comments of the topic associated with the content item, and a quality of comments on the topic associated with the content item, identifying the one or more candidate content items that have not been shared by the community members, applying the trained machine learning model to each of the candidate content items, generating a score for each of the identified candidate content items not shared by the community members using the machine learning model, where the score is a prediction of a likelihood of the candidate content item to be selected for the community digital magazine, and selecting the one or more identified candidate content items based on the scores associated with the identified candidate content items; and presenting the selected one or more candidate content items in the community digital magazine to the community members.

2. The method of claim 1, wherein identifying the one or more candidate content items that have not been shared by the community members for the community space comprises:

generating a community topic list, the community topic list including a topic of each content shared into the community space;

ranking topics on the community topic list; and selecting the candidate content items based on the ranking of the topics.

3. The method of claim 1, wherein the user who sent the first sharing request becomes a representative of the community space, the representative of a community space having one or more privileges over other community members.

4. The method of claim 3, wherein the one or more privileges associated with the representative of the community space include having a higher priority for the content contributed by the representative of the community space.

5. The method of claim 1, wherein creating the community space in a digital magazine server comprises:

determining whether the community space requested by the user who sent the first sharing request exists in the digital magazine server; and creating the community space in response to the requested community space not being in existence.

6. The method of claim 1, wherein creating the community space in a digital magazine server further comprises:

selecting two or more existing community spaces; and determining a topic associated with each selected existing community space.

7. The method of claim 6, further comprising:

determining whether to combine two or more existing community spaces based on a measure of relevance of the topics associated with the existing community space; and combining the two or more existing community spaces in response to the topics associated with the two or more existing community spaces being closely related.

8. The method of claim 1, further comprising preventing each content item presented in the community digital magazine from being deleted by a community member of the community digital magazine.

9. A non-transitory computer-readable storage medium storing executable computer program instructions for content sharing in a community space, the computer program instructions when executed by a computer processor cause the computer processor to perform steps comprising:

receiving a first sharing request for the community space from a user;

creating the community space in a digital magazine server, the community space comprising a community space identification (ID) and an allocated storage space for the community space in the digital magazine server;

generating a community digital magazine for the created community space;

receiving one or more content items for the community digital magazine contributed by a plurality of users, wherein each of the plurality of users is a community member of the community digital magazine, and each content item from a community member of the community digital magazine is shared with remaining community members of the community digital magazine;

presenting content contributed by the one or more community members in the community digital magazine; and automatically selecting one or more candidate content items that have not been shared by the community members for the community digital magazine based on the content items previously contributed by the community members, wherein the automatic selection comprises:

accessing a machine learning model trained using information about a set of content items including the content items previously contributed by the community members, each content item being associated with a topic, where a label of the machine learning model is whether each content item was added to the community space, and one or more input features of the machine learning model include one or more of: a frequency of sharing of the topic associated with the content item, a number of comments of the topic associated with the content item, and a quality of comments on the topic associated with the content item, identifying the one or more candidate content items that have not been shared by the community members, applying the trained machine learning model to each of the candidate content items, generating a score for each of the identified candidate content items not shared by the community members using the machine learning model, where the score is a prediction of a likelihood of the candidate content item to be selected for the community digital magazine, and selecting the one or more identified candidate content items based on the scores associated with the identified candidate content items; and presenting the selected one or more candidate content items in the community digital magazine to the community members.

10. The computer-readable storage medium of claim 9, wherein identifying the one or more candidate content items that have not been shared by the community members for the community space comprises:

generating a community topic list, the community topic list including a topic of each content shared into the community space;

ranking topics on the community topic list; and selecting candidate content items based on the ranking of the topics.

11. The computer-readable storage medium of claim 9, wherein the user who sent the first sharing request becomes a representative of the community space, the representative of a community space having one or more privileges over other community members.

12. The computer-readable storage medium of claim 11, wherein the one or more privileges associated with the representative of the community space include having a higher priority for the content contributed by the representative of the community space.

13. The computer-readable storage medium of claim 9, wherein creating the community space in a digital magazine server comprises:
   determining whether the community space requested by the user who sent the first sharing request exists in the digital magazine server; and
   creating the community space in response to the requested community space not being in existence.

14. The computer-readable storage medium of claim 9, wherein creating the community space in a digital magazine server further comprises:
   selecting two or more existing community spaces; and
   determining a topic associated with each selected existing community space.

15. The computer-readable storage medium of claim 14, further comprising:
   determining whether to combine two or more existing community spaces based on a measure of relevance of the topics associated with the existing community space; and
   combining the two or more existing community spaces in response to the topics associated with the two or more existing community spaces being closely related.

16. The computer-readable storage medium of claim 9, further comprising preventing each content item presented in the community digital magazine from being deleted by a community member of the community digital magazine.

\* \* \* \* \*